(12) United States Patent
Kerpan et al.

(10) Patent No.: US 7,146,603 B2
(45) Date of Patent: Dec. 5, 2006

(54) CONTEXT PROGRAMMING IN OBJECT-ORIENTED ENVIRONMENTS

(75) Inventors: Patrick Kerpan, Wilmette, IL (US);
Stan Berkovich, Evanston, IL (US);
Aron Leger, Westford, MA (US)

(73) Assignee: Borland Software Corporation, Scotts Valley, CA (US)

( * ) Notice: Subject to any disclaimer, the term of this patent is extended or adjusted under 35 U.S.C. 154(b) by 468 days.

(21) Appl. No.: 09/755,955

(22) Filed: Jan. 5, 2001

(65) Prior Publication Data

US 2002/0129348 A1    Sep. 12, 2002

(51) Int. Cl.
 *G06F 9/44* (2006.01)
 *G06F 9/45* (2006.01)

(52) U.S. Cl. .............. 717/120; 717/127; 717/170; 707/203

(58) Field of Classification Search ........ 717/100–178; 709/201–224; 707/203
See application file for complete search history.

(56) References Cited

U.S. PATENT DOCUMENTS

| | | | | |
|---|---|---|---|---|
| 5,347,653 A | * | 9/1994 | Flynn et al. | 707/203 |
| 5,442,771 A | * | 8/1995 | Filepp et al. | 709/219 |
| 5,819,092 A | * | 10/1998 | Ferguson et al. | 717/113 |
| 5,862,325 A | * | 1/1999 | Reed et al. | 709/201 |
| 6,185,556 B1 | * | 2/2001 | Snodgrass et al. | 707/3 |

OTHER PUBLICATIONS

Takayuki Suzuki et al., *Development and Performance Analysis of a Temporal Persistent Object Store POST/C++*, Microsoft Internet Explorer Dec. 11, 2000.
A. Tansel et al., *Temporal Databases*, Benjamin/Cummings Publishing Company, Inc. 1993.

* cited by examiner

*Primary Examiner*—Tuan Dam
*Assistant Examiner*—Chuck Kendall
(74) *Attorney, Agent, or Firm*—Darby & Darby

(57) ABSTRACT

An object-oriented context programming system is formed with data objects. Each data object defines a class of object which will typically have at least one attribute. This attribute is stored in the database with an indication of the effective context, e.g., time, of the attribute. Any change in attribute, e.g., over time, is also stored in the data object along with an indication the context in which it is effective. In a temporal context, it would be saved with the time of effect of the change in the attribute. Methods associated with the class, and which the class can carry out, have an argument which includes the context, which could be time. These methods are also stored in the database with an indication of the effective context (e.g., time) of the method. Any change in the method is stored in the data base along with an indication of the context in which it is effective, e.g., the time of effect of a change in the method in a temporal context. Execution of the method with a particular context argument utilizes the attributes of the effected data objects and the particular method which were in effect for the context. The context can be a particular time specified or a point of view or vantage point.

14 Claims, 6 Drawing Sheets

Object Oriented Runtime Comparison

OOP

To evaluate Object.Field1:
1) Lookup static type,
2) Lookup static Field1 location
3) Retrieve value.

Temporal OOP

To evaluate Object.Field1:
1) Lookup Type at time T,
2) Lookup Field1 location,
3) Lookup value at time T,
4) Retrieve value.

GENERAL ERROR CONDITIONS

ADD_NEW_ATTRVAL_SHIFT (ONE END-POINT)

ADD_NEW_ATTRVAL_SHIFT (ONE END-POINT)

ADD_NEW_ATTRVAL_SHIFT (TWO END-POINTS)

GENERAL ERROR CONDITIONS

ADD_NEW_ATTRVAL_SQUEEZE (ONE END-POINT)

ADD_NEW_ATTRVAL_SHIFT (ONE END-POINT)

ADD_NEW_ATTRVAL_SQUEEZE (TWO END-POINTS)

ERROR CONDITION-ADD_NEW_ATTRVAL_SQUEEZE

FINAL_EDIT_ATTRVAL_SHIFT

VFINAL_EDIT_ATTRVAL_SQUEEZE

ERROR CONDITION-FINAL_EDIT_ATTRVAL_SQUEEZE

▨ (600, 700) ⟹ (510, 790)  NEIGHBORS BECOME TOO SMALL

▨ (600, 700) ⟹ (490, 810)  NEIGHBORS' BOUNDARIES EXCEEDED
                            BY NEW ATTRVAL FROM/TO RANGE

When MIN_ATTRVAL_SIZE ==20 (for example)

FINAL_REMOVAL_ATTRVAL_SHIFT

FINAL_REMOVAL_ATTRVAL_LEAVE_GAP

FINAL_REMOVAL_ATTRVAL_FILL

CONTEXT PROGRAMMING IN OBJECT-ORIENTED ENVIRONMENTS

BACKGROUND OF THE INVENTION

This invention relates to computer programs for managing data entities or objects and, more particularly, to computer programs for managing data entities or objects that can, need, or should manage time-structured or other context data, with a seamless ability to persist to an industry standard relational database.

"Time structured" data is data that varies with time, e.g. stock prices or quotes, retail product prices, corporate titles, home addresses (past, current and future). With this type of data, the same attribute, e.g. the price, has a value that may be, and most likely is, different at different points in time. Computer programs that must manage data structures for time structured data are constructed idiosyncratically by individual programmers over and over on a case-by-case basis. Thus, despite the fact that most data is "time structured," there is no uniform and consistent way of dealing with this type of data. In fact the complexity of managing this problem has generally been ignored.

Dealing with time structured information, e.g., stock quotes, has implications not only for program design, but also for the structure of databases for the information. One way to deal with information that changes over time is merely to store the current value of the variable, and overwrite it with new data when a change occurs. In this example, the user could ask for the price of the stock in ABC Company and the program would get the stock value of ABC Company from a data table of companies and stock prices in the database. However, this system would not be able to tell the user the price of the stock last month. To overcome this, the database would have to retain the stock price for at least a month in the past, and perhaps for the last twelve months. Thus, instead of a single table, there could be twelve tables of companies and stock prices, each for a separate month or other temporal period. Then the program would have to be directed to get the stock value of the company from the table containing the month in question. As the need to have stock prices over a longer period of time increase, the number of tables would increase. The same would be true if the information were needed more frequently than monthly, e.g., weekly, daily, hourly or by the minute or second. Thus, the database would get increasingly larger and more complex, and the program would also have to be more complex, e.g., to find the price at a particular second on the third day of the month, three months ago.

Further, with increased amounts of data, the program may be called upon to take more sophisticated action. Instead of giving the price at a particular time, it may be asked for the highs and lows for the year, or the trend, or to graph a five month running average of the stock price.

In this simple example, the storing of time data is simplified by having a separate data table for each period of time and storing the stock prices for each company of interest in a different table for each period of time. This creates a very large database, which could be reduced in size if only changes in stock prices and their time of occurrence was stored. This reduces the burden on the database, but complicates the program. In particular, it has to figure at what time a particular value of the variable was in effect.

In the prior art, either nothing was done about having an attribute whose value is "as of" a certain time or it was generally handled in independent unrelated fashion by individual programmers. In the case of a stock price quote database, the programmer creates a database model for storing the time structured data and then creates special routines for storing the time-structured data in the database as well as special routines for manipulating the time-structured data inside the memory of the computer program. This technique for handling temporal data in databases is described in Cummings et al., *Temporal Databases*, Benjamin Cummings Publishing (1983). In particular, in this text the authors disclose techniques in database programming for an "as of" parameter, but not with respect to programming objects.

Object-oriented programming is a form of modular programming that allows pieces of software to be reused and interchanged. In this form of programming self-sufficient modules that contain data and the processing or method (data structure and the functions that manipulate that data) are created, i.e., encapsulated. These user-defined data types are called classes. One instance or occurrence of a class is called an object. For example, in a payroll system, a class could be defined as a person, with information about the person stored as a data structure. Further, the capabilities of the person could be defined as functions which the person can perform. The stored information can be referred to as fields, member variables or attributes of the object or class.

The paper Suzuki et al., "Development and Performance Analysis of a Temporal Persistent Object Store POST/C++," Doctoral Degree Program in Engineering, University of Tsukuba, Tennohdai, Tsukuba, Ibaraki 305 Japan suzu@dblab.is.tsukuba.ac.jp (Jan. 30, 1996) describes the use of Object Database Management Systems (ODBMS) in advanced database applications to manage complex objects and objects that have associated inherent procedures or methods. According to this paper, some applications require temporal and historical information management in the context of such object management. To accomplish this, a temporal persistent object model is proposed This model treats past states of persistent objects as different objects, and supports uniform manipulation of current and past states of objects. An implementation of a temporal persistent object management system, named POST/C++, is described. This system stores objects based on C++ and manages their histories of updates by user transactions based on the temporal persistent object model. Since each store is of a new object, the system is not very memory efficient. Further, while proposing a uniform way of dealing with (or manipulating) the temporal data, the paper does not propose a uniform way of dealing with (or manipulating) the temporal data stored while it is in use in an actual running computer program, especially one designed using an object-oriented language.

It would be advantageous if there were a unified way or common programming model for use by application developers in managing context date, e.g., time or temporal data information and point of view information.

SUMMARY OF THE INVENTION

The present invention is directed to control of time structured or other context related data by adding a context in object-oriented programming environments. In particular, the present invention provides a generic mechanism for managing "temporal" data in object-oriented environments. This makes the problem of managing such data very consistent and manageable in programs written in disparate locations, by disparate programmers, at disparate times. It allows users to easily manage this type of complexity for superior information systems—as opposed to just ignoring this element, which exists in almost all business systems.

In an illustrative embodiment of the invention, an object-oriented temporal database system includes data objects, with each data object defining a class of object, typically having at least one attribute. This attribute is stored in the database with an indication of the effective time of the attribute. Any change in attribute is also stored in the data object along with an indication of the time of effect of the change in the attribute. Methods associated with the class and which the class can carry out have an argument which includes the time. These methods are also stored in the database with an indication of the effective time of the method. Any change in the method is stored in the data base along with an indication of the time of effect of the change in the method. Execution of the method with a particular time argument utilizes the attributes of the effected data objects and the particular method which were in effect for the particular time specified.

An application of an embodiment of the present invention would allow a stock object to be created with a single attribute (for sake of argument) called current-price. A method would be created called "set-current-price" and it would take two parameters; price and time, i.e., a temporal context. As a stock price is read off of the ticker along with a time for the price, the program merely creates a temporal context as of the time from the ticker and then calls:

set-current-price(price, context).

With the arrangement of the invention, the programmer does not have to create any mechanism for managing the time-structured data—he merely had to learn how to use the temporal context concept. This approach is identical for any situation where the programmer needs to manage time-structured data.

In addition to creating a temporal database, an exemplary embodiment of the present invention also utilizes temporal methods or functions, i.e., methods or functions that may change over time or at least select data objects for processing based on a specified time and the temporal context stored with various versions of the data object. When a function call is made, according to the present invention a particular context, e.g., time, is stated as well as the object to be operated upon. The function then operates on those data objects that are valid for the specified time. Thus, if three years ago, Joe was a supervisor and today he is a manager. If the function "list position" is caused to operate on the object Joe, if the time is listed as three years ago, the output will be "supervisor." If the no time is entered, indicating the default time of now, the answer to the output for the same function will be "manager."

Also, functions can be changed over time. For example the function "list position" may previously listed the position without regard to department. However, the system can be changed so that the same function will now also list the department. Thus, list position in the temporal context now, would be "manager of maintenance." If the query was made three years ago, it would still say "supervisor" without the department, since that form of the function was not in effect three years ago. This demonstrates that the present invention can not only handle past information, it can present it in the same way it would have been viewed if the system were being used in the past.

The present invention makes a wide array of business problems easier to manage or even worth managing across many domain types. For example, most HR systems require special coding to answer a question like "of the people who work here today, who also worked here three years ago, what promotions did they get two years ago. This becomes a simple query with the present invention, once the temporal context of two years ago is set as the argument.

With prior systems contact managers cannot answer the question: "where did Bob Smith work three years ago, then show me all of the people who worked at that company while Bob Smith worked there but show me the company I have in the contact manager program for where they worked the year after Bob Smith left that company." By setting simple queries at different times, this can be easily performed with the present invention.

To value a financial derivative instrument the instrument is rapidly cycled through the past and the immediate future with the valuation routine being passed data regarding interest rates, exchange rates, forward prices, volatilities, betas, etc. Managing the manipulation of thousands of parameters back and forth through time is cumbersome and error prone. The present invention removes a significant amount of complexity for this problem.

Permissioning systems for access to data usually are "on" or "off"—either the person has permission to see that data or they don't. To the extent they implement that a person has permission to some type of data in a time range—it is implemented idiosyncratically. The present invention makes time-based permission systems much easier to implement, and as important, much easier for the application programmers to use.

In a broader sense, the context can be something other than time. For example, it can be a vantage point, e.g., an experience of different versions of an application program developed simultanously. If data objects and methods are stored with a version (or point of view) context indication, and different users are assigned or select different vantage points, each can experience the same program and database as though it they were different.

In some situations time and point of view or vantage point are related. In particular, the time could be in the future, so that the context would be a prediction of future events. While there is a generally accepted past, there is no generally accepted future. Therefore, future predictions may depend on various factors so that different points of view in the future may have different probabilities of occurring.

As a consequence, the invention broadly relates to an object-oriented context database system which includes data objects, where each data object defines a class of object with attributes. Preferably, at least one attribute of one data object is stored or used with the data object in the database along with an indication of the context (e.g., version 1) of the attribute. Any difference in the attribute's value (e.g., version 2) is also stored in the data object along with an indication of the context of the change in the attribute (e.g., a version number). At least one of the methods which the class of objects can carry out has an argument which is an indication of context (version number). A method executed with a particular context argument utilizes the attributes of the affected data objects in effect for the particular context (e.g., version) and the method is carried out according to the parameters of the method in that specified context. Either the data attributes or the method may be made to vary with context, but it is not necessary that they both vary. If nothing is specified, the current context is assumed and the most recent attributes are used.

If implemented in Java or C++, a temporal base object or class, e.g. named bdTemporalPersist, can be created with generic methods (i.e., setters and getters) for different data types in a context such as time. This base class can then be used as a development tool, and an application developer could create new objects for a specific application as subclasses of the base class that inherit its temporal or other context capabilities for reading (getting) or storing (setting) data objects. Since, there are different data types in a system, e.g., int, float, etc., the get and set statements in the base object would have to be established to accommodate each.

The technique of the present invention provides fundamentally new features and functions for users of programming languages, programming language virtual machines (e.g., Java), release control systems, source control systems, database systems, development environments, sales force automation or contact management, cost allocation systems, and project management systems. This technique helps to solve some of the emerging problems in the XML technology space to help mange DTD and SCHEMA versioning, as well as for providing a support for a generic XML storage and retrieval system implemented differently than the current competitors.

BRIEF DESCRIPTION OF THE DRAWINGS

The foregoing and other features of the present invention will be more readily apparent from the following detailed description and drawings of illustrative embodiments of the invention in which.

Figure 1:
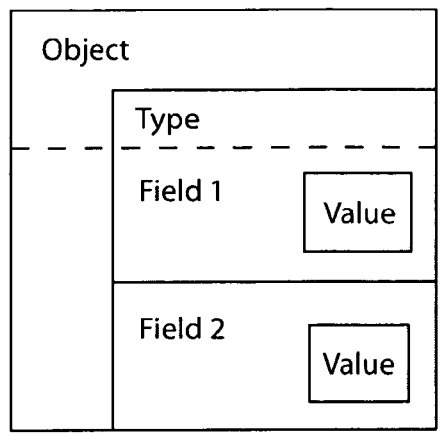
FIG. 1 is an illustration of the structure of a conventional data object in an object-oriented programming enviromnent at run time.

DESCRIPTION OF ILLUSTRATIVE
EXEMPLARY EMBODIMENTS

At an abstract level, in an object oriented program if there is a call to perform some function, e.g., a move function, applied to a data object, the data object determines "what" it is, i.e., what class it has. Based on this, it determines how to move. This is called the dispatch and may be referred to as "late binding." In particular, the instructions for the data object's move are bound to the data object after the command to move. The present invention may be described as "even later binding." The data object first determines "when" it is, i.e., what time is being referenced. Based on the time it determines "what" it is. Based on what it is, i.e., the class it belongs to at the referenced time, it looks up how it moves according to the attributes of that class at that time. This may also be generally referred to as "Temporal Context Programming (TCP)."

This concept of temporal context programming is implemented by a structural change, i.e., by associating with the data object its attributes a various points in time, e.g., whenever they change. As an example, in a human resources database, a person such as John Jones would have his salary entered. This salary attribute would change every year. In a conventional system a query might be: What was John Jones' salary three years ago? According to the invention, the system would be told that it is three years ago and the query would be: What is John Jones' salary. An example in a financial services system you might have a model for tracking stock prices. The system may have an IBM stock object and while building the database, you would store the stock price and time together, e.g., hourly. Then, when you want to do a graph of the stock price over the last 20 days, you already have the tie points. Also, you can tell the system it is any day you want, and it will act as if it is that day and give you answers to queries based on that temporal context.

As another example, in a chess playing game, each piece would be an object with certain attributes, e.g., its position and the way that it moves. As the game is played, when a move is required the system will assume it is the current time, the piece will determine from a table how it can move, and its moves will be executed along with the moves of other pieces. If a pawn reaches the last row in the game, it can be changed into any other piece. Thus, what the piece is may change with time. Thus, at each step of the game, the piece, its move, its position and the time are stored in a database. In a conventional system, the old attributes are typically overwritten with the new ones.

Further, if you want to replay the chess game from any point, one would have to have written special purpose code to repeat every motion of the game, i.e., every change of state. A specific set of instructions would have to be created, and this code will be idiosyncratic, i.e., would not be a standard code, but would vary with the programmer creating it. According to the invention, the chess playing system is merely told that the current time is some time in the past and to continue play. It will access the database, select the data from the selected time and follow the data path set by the database's prior storing of the temporal context data. No special code is needed to recapture that information because every state of the piece over time was automatically saved. Thus, a transformed queen piece can be queried as to its status 15 moves ago. This would be done by telling the system that the current time is 15 moves ago, then the piece would be asked "what is your status?" It would answer "pawn," rather than queen, at location king's knight-7.

Since the underlying system, which in Java could be a base temporal object or class, keeps track of the temporal context, and stores it in the database, the programs written to operate with the database are created as is typically done, but the programmer must remember that every function call has a temporal parameter, i.e., a context parameter is added to every method call. There is not simply a time field added. If the temporal context is not specified, it will be assumed to be current time. However, another time can be specified in order to perform a past inquiry in a standard repeatable fashion, as opposed to an idiosyncratic way, and without new code. The query can be for a single time in the past, or the system can be sequenced in reverse time to look back through the history of the game in the reverse direction. As noted above, time can be reset to the beginning and the game played in the forward direction again.

To save space in a temporal context database, only changes need to be stored. If one parameter changes every hour, its status needs to be saved that often. However if a parameter changes every year, it only needs to be saved once a year. Each data object, e.g., each chess piece, may have parameters or attributes that change at different intervals. Thus, for one data object, the frequently changing attribute will use a lot of memory and the infrequently changing one will use only a little memory. Because of the increased memory load, one would only use a context database where there are likely to be frequently queries about past conditions. For example, a human resource database is frequently queried for information about a person's last address, previous position in the company, salary history, etc. Thus, the present invention would be useful in that application. The same would be true of financial systems where stock price history may be needed frequently in order to predict future price. It is particularly useful in a system for calculating financial derivatives where you need to know the value of an option based on the price at sale and the prevailing interest rates and the market volatility. A temporal context system is also useful in constructing audit trails.

Prior programs have been written to show past events, e.g., stock prices on the close of each day. Once written, you cannot go back and get the prices at noon on each day, because that information was not saved and the program was not written to do so. With the present invention, each change in attribute is saved. Thus, you can ask for the status as any time in the past, e.g., 1:00 p.m. each day. You can also ask for another attribute, e.g., price to earnings ratio. No special code needs to be written, all that must be done is to query the database.

The context parameter approach to implementing this invention is one of the major possible ways to implement. This approach can be used for object-oriented environments, such as Java, where the implementor does not want to modify the object language's "virtual machine" and the language does not support what is called a "meta-object protocol". The Java language is such an example. LISP and Smalltalk have a form of "meta object protocol" that would allow a deeper implementation where the context could be local to a given processing thread—without explicitly passing the context parameter around. In functional languages C, C++, LISP, the context could be implemented using the lexical scoping rules of the language which define what variables can be seen by which parts of the program—in these functional languages the context could be methods or functions that could just be called, and the system would provide them.

FIG. 1 shows the structure of a conventional data object in an object-oriented programming (OOP) environment at run time. The data object may be, for example, an employee of a company. Thus, the type or class of the object would be "employee." There are certain fields or attributes associated with the class employee. These could include name in Field 1, address in Field 2, etc. In an OOP system the object would be stored in database. At runtime, if an operation were being performed on the object, i.e., a function call identified the object, the system would first look up the type or class of the object, which would be fixed or static. Then the fields of the class would be determined, which again would be static. The values of the fields would then be retrieved from the database.

If the object were a chess piece, one of the attributes could be "move," i.e., the way the piece moves. This, as well as other values of the fields would have an effect on the result of the function call.

If the number of fields of a class or the values of those fields were to change over time, in conventional OOP, a new type object is created by overwriting the old one. Thus, the system is incapable of being reset to an earlier point in time. The Suzuki paper identified above, calls for the storing of old versions of the object when there is a change in the value of one of its fields. Then, when information about a prior time is requested, e.g., the employee's prior address, it is at least available. However, other than an index that identifies the older versions of the object, the Suzuki paper still leaves it to the programmer to deal with this temporal information. Thus, no standard means for dealing with context in general and temporal context in particular is known in the prior art. In addition, in this paper there is no concept of absolute time. It uses a floating time "now" which is the current value of the attribute. Thus, the system cannot handle future time.

Figure 2:
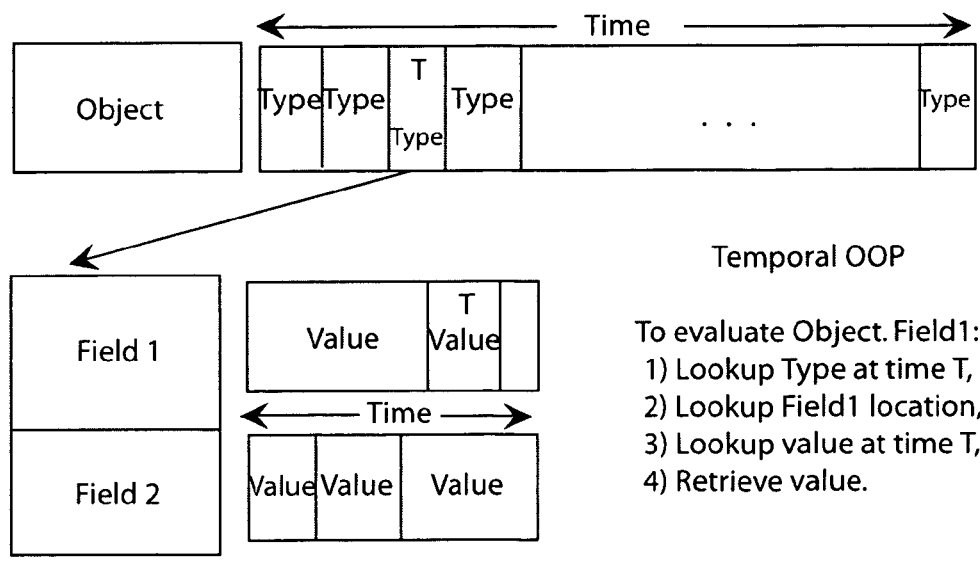
FIG. 2 is an illustration of the structure of a data object according to the present invention in a temporal object-oriented programming environment at run time.

FIG. 2 is an illustration of the structure of a data object according to the present invention in a temporal OOP environment at run time. Here it can be seen that an object over time can have a change in type, and these are stored in the database along with an indication of the period of time for which this type was in effect. A type change occurs only when there is a change in the number or parameters of the fields. This is usually a rare occasion.

However, information or the value of a field may change on a frequent basis, e.g., the value of a stock. When the value changes, that value alone is saved in the database along with a temporal indication. Thus, unlike Suzuki, every value change does not result in the saving of a complete new object.

At runtime, when using the present invention, function calls define the context, e.g., time, of interest. If no time is specified, the current system time is assumed. In response to the function call identifying a particular context, e.g., time, the system looks up the class or type of the object at that time. It then looks up the field values in effect at that time for the class, and retrieves those values. Thus, the object class as well as the values for the attributes may be different over time. However, the database stores this information in such a way that all the programmer has to do is specify a function call and the context, e.g., time, and the context (temporal) problem is handled in a standard way by the system.

In the prior systems, if the address of an employee three years ago was desired, the system may not be able to produce the information. If it were anticipated in advance that such information might be needed, this attribute alone (i.e., last address) would be stored. For example when a new address is given, the past address could be moved to a past address field. Then special code would be written to get the past address (e.g., a "get past address" code). Even with the Suzuki system, while past information is available, special code must be created to get to it.

With the present invention, you do not have to anticipate what prior information will be needed, it is all kept. Further, it need not be stored in a special place, e.g, the past address field. Rather it is stored in the address field of the object along with any other prior address and the current address. Each address, however, is stored with an indication of the time when it was effective. The conventional function call "get address" can be used for any of the prior addresses. The function just specifies a time and states get address. It is not even necessary to know that the address was different three years ago. The system keeps track of the effective address at any point in the past and function codes that would be effective for current data apply to the past data so long as the temporal context is specified in the function call.

The following is an example, called bdProfessor.java, of an implementation of temporal context programming. It assumes the existence of a base temporal object called bdTemporalPersist, which is used to create subclasses with temporal context. The code indicates how the created application program operates in the various temporal contexts. Initially the various time contexts are defined as follows:

The first temporal context is "now." This indicates that the current time is the context.
    bdContext now=new bdContex( );

In this arrangement "new" is the operator and it is explained in more detail below. bdContex( ) is the constructor. This creates a new variable called "now" which is of the type called bdContext. The second context is "always," i.e., the value is always the same.
    bdContext always=new bdContext(new bdContextArgs( )
    {{
      getTemporalType=bdContext.TEMPORAL_TYPE_
        ALWAYS;
      setTemporalType=bdContext.TEMPORAL_TYPE_
        qjALWAYS;
    }});

Note that the context accessor is split into "get" and "set" arguments or parameters. "Get" defines how the data object is read and "set" defines how it is saved. In most cases it may not be necessary to have separate acessors defined. These are somewhat like the situation in Java Beans which has access or "methods through properties" to make side effects happen or Enterprise Java Beans which has the "container managed persistence." While similar in structure to these feature in other programs, the use is quite different in the present invention.

Another temporal context, "when" is defined as follows:
    bdContext when=new bdContext(new bdContextArgs( )
    {{
      getTemporalType=bdContext.TEMPORAL_TYPE_
        WHEN;
      setTemporalType=bdContext.TEMPORAL_TYPE_
        WHEN;

getWhen=setWhen=new bdDate(5, 5, 1975, 5, 5, 5);
    }});

The date is specified as month, day, year, hours, minutes and seconds with single integers separated by commas, except for date which has four integers.

Where is a single value or date the "single" context is used.
    bdContext single=new bdContext(new bdContextArgs( )
    {{
      getTemporalType=bdContext.TEMPORAL_TYPE_
        SINGLE;
      setTemporalType=bdContext.TEMPORAL_TYPE_
        SINGLE;
      getFrom=setFrom=new bdDate(1, 1, 1971, 1, 1, 1);
      getTo=setTo=new bdDate(9, 9, 1979, 9, 9, 9);
    }});

Another single date can be defined as single2 as follows:
    bdContext single2=new bdContext(new bdContextArgs( )
    {{
      getTemporalType=bdContext.TEMPORAL_TYPE_
        SINGLE;
      setTemporalType=bdContext.TEMPORAL_TYPE_
        SINGLE;
      getFrom=setFrom=bdDate.getMinDate( );
      getTo=setTo=new bdDate(2, 2, 1972, 2, 2, 2);
    }});

"Range" is used to set a range of time and is defined as follows:
    bdContext range=new bdContext(new bdContextArgs( )
    {{
      getTemporalType=bdContext.TEMPORAL_TYPE_
        FIRST_IN$_{13}$ RANGE;
      setTemporalType=bdContext.TEMPORAL_TYPE_
        RANGE;
      getFrom=setFrom=new bdDate(3, 3, 1973, 3, 3, 3);
      getTo=setTo=new bdDate(4, 4, 1974, 4, 4, 4);
    }});

Note that unlike the others, the TemporalType for get and set are not the same for "range." This is because "get" requires a single value and a range is a multitude of values. To take care of this, it is set to the first value in the range.

Turning now to the application bdProfessor.java, its codes show the exact implementation of the various types of bdContext. The simplest of these is the always context, which signifies non-temporal behavior. An attribute set with always will have a single value, valid from never to forever, just like a standard java variable.
    bdPersistExample example=new bdPersistExample( );
    System.out.println("setting    int    to    8660400,
      ALWAYS . . . ");
    example.setInt(8660400, always);
    for(Enumeration e=example.getAttributeValues("int");
      e.hasMoreElements( );
      System.out.println(e.nextElement( )));
    pause( );

This code causes the program to have a temporal variable called "Int," which always has a value of 8660400. In particular, "always" is the context. The "for" operator causes the program to pull all values through time for Int in the object called "example."

Like always, a single context is non-temporal. Only one value will ever be present in the database using single and always. Unlike always, singles can have boundary dates defining its valid interval. A single will always use an attribute's existing dates while retrieving, but when setting, any dates provided by the context will overwrite the existing interval.

```
System.out.println("setting int to 1840, SINGLE . . . ");
example.setInt(1840, single);
for(Enumeration e=example.getAttributeValues("int");
   e.hasMoreElements( );
   System.out.println(e.nextElement( )));
pause( );
```

Setting with a non-temporal context when the attribute has only one value in the database will totally overwrite that value. Once an attribute becomes temporal, having two or more values, non-temporal contexts cannot be used at all, and an exception will be thrown (error indicated) if an attempt is made to do this.

```
System.out.println(single2);
System.out.println("setting int to 847, SINGLE . . . ");
example.setInt(847, single2);
for(Enumeration e=example.getAttributeValues("int");
   e.hasMoreElements( );
   System.out.println(e.nextElement( )));
pause( );
```

The range contexts define both a "from" date and a "to" date for an attribute. Since a given range in the database may contain more than one valid value, when "getting," only FIRST_IN_RANGE or LAST_IN_RANGE may be used, to ensure that only one value is returned.

```
System.out.println(range);
System.out.println("setting int to 8660, RANGE . . . ");
example.setInt(8660, range );
for(Enumeration e=example.getAttributeValues("int");
   e.hasMoreElements( );
   System.out.println(e.nextElement( )));
pause( );
```

The when context defines the interval between a certain time and forever, i.e., Dec. 31, 9999. When "setting," the entire range will be used, but when "getting," only the given time is important.

```
System.out.println(when);
System.out.println("setting int to 400, WHEN . . . ");
example.setInt(400, when);
for(Enumeration e=example.getAttributeValues("int");
   e.hasMoreElements( );
   System.out.println(e.nextElement( )));
pause( );
```

The now context is the most common temporal context, and is also the default type for a new context. Its "from" date is always the current system time, and its "to" date is forever. No matter when the now context is created, it will always behave as if its "from" date is the current system time.

```
System.out.println(now);
System.out.println("setting int to 1840, NOW . . . ");
example.setInt(1840, now );
for(Enumeration e=example.getAttributeValues("int");
   e.hasMoreElements( );
   System.out.println(e.nextElement( )));
pause( );
```

There is only one condition that will allow any portion of a new value to temporally overwrite any portion of an existing value. When the new "from" date is after the old "from" date, and both "to" dates are exactly the same, the set operation will be permitted. In other cases, and error will be indicated. Thus, when "setting" using contexts other than now, it should be noted that other kinds of contexts might be used later to "set" on that attribute. For instance, "setting" to a future-dated WHEN will prevent any further "setting" with now."

```
bdContext future=new bdContext(new bdContextArgs( )
{{
   getTemporalType=bdContext.TEMPORAL_TYPE_
      WHEN;
   setTemporalType=bdContext.TEMPORAL_TYPE_
      WHEN;
   getWhen=setWhen=new bdDate(0, 0, 2020, 0, 0, 0);
}});
System.out.println(future);
System.out.println("setting int to 475, WHEN . . . ");
example.setInt(475, future);
for(Enumeration e=example.getAttributeValues("int");
e.hasMoreElements( );
System.out.println(e.nextElement( )));
```

The "future" context is a special case of "when" where the date is set in the future. In this example it is set for the year 2020.

A test for error detection using conventional try-catch coding can be made with respect to the foregoing example. In that example the value of Init was set at 475 in the future. The following code now tries to set it to 800.

```
Up System.out.println(now);
System.out.println("setting int to 800, NOW . . . ");
try
{
   example.setInt(800, now);
}
catch(Exception exc)
{
   System.out.println(exc);
}
pause ( );
}
```

This will produce an error indication.

The following is an example of the creation of a temporally persistent class in an application. This class is temporally persistent object during runtime. The class itself does not contain its own data members, but still functions as if it did. It contains basic accessors for all the primitives that bdTemporalPersist can handle.

BdTemporalPersist is the basic temporal context object or class. It can be distributed and used as a tool to create temporal context program applications. In any situation, a person of ordinary skill in the art would be capable of creating such an object. All that is required is that it be provided with context, temporal or otherwise. In a temporal context, it would have the date/time as a parameter, see bdContextwhen above which defines getWhen=setWhen=new bdDates (5,5,1975,5,5,5). Then different useful temporal parameters can be defined for bdTemporalPersist as desired. The more that are defined, the fewer the applications programmer has to create.

Independent implementation of a base object would behave similar to a multidimensional array (for example a nested lookup table) where the dimensions are essentially (1) the object you are working on, (2) the attribute in question and (3) the date or other context in question. There are many ways of doing this. However, once done, the base object can be used again and again in the development of other applications.

In an illustrative embodiment, bdTemporalPersist would implement generic setters and getters for different data types, e.g., int, float, date, string, money, collection, hashtable, etc. These could include getName, setName, set initNewInstance, etc.
public class bdPersistExample
    extends bdTemporalPersist Using this Jave example, the foregoing code creates the bdPersistExample used above as an extension, i.e., subclass, of bdTemporalPersist. As a result, bdPersistExample inherits all of the capabilities designed into bdTemporalPersist and they can be used as needed. This essentially passes the capabilities from the base object to any object created as a sub-class of it. This is an advantageous way to implement the context in Java or C++. However, in other programming contexts, it may be better to implement general context methods that can be called at any time, regardless of whether an object is a sub-class of a base object that has these capabilities.

Data members of the subclass bdPersistExample can now be defined. One of these is ClassName.

This is a String representing the fully qualified name of the class.
    public final static String CLASSNAME
        =bdPersistExample.class.getName( );

These are not program declarations, but are comments present merely for reference. Some pre-existing subclasses of bdTemporalPersist do not document their temporally persistent members in this fashion. Note that the members' names can be reserved words, though this is not advisable. It is done here to indicate their data types. Non-primitive types are all mapped into the database the same way, as generic objects. bdTemporalCollection is the multiset class, and bdTemporalHashtable is the hash table class.

| Variable Name | Type |
| --- | --- |
| // tpersist bdTemporalCollection | collection ; |
| // tpersist bdTemporalHashtable | hashtable ; |
| // tpersist bdDate | date ; |
| // tpersist bdMoney | money ; |
| // tpersist float | float ; |
| // tpersist String | text ; this text string can have up to 2048 Mb. |
| // tpersist boolean | boolean ; |
| // tpersist int | int ; |
| // tpersist long | long ; |
| // tpersist String | string ; ths numeric string can have up to 255 characters |

The following indicate the data structure in the database being used. If this structure is used, bdTemporalPersist can handle the temporal context without database programming. This limits flexibility somewhat, but greatly simplifies the problem of dealing with temporal context. Using these structures requires that these SQL commands first be executed in the database being used:
insert ClassList values("com.bedouin.Professor.bdPersistExample", 22769601, "com.bedouin.Base.Runtime.bdTemporalPersist", "UNBOUNDED", "none", 0, 0)

While this and the others indicate a manual insert, they have similar structure and could be entered automatically. The structure the database table name, the fully qualified Java name of the class, a number identification, the fully qualified Java name of the base class of which the class is an extension, and memory management information. Other structures for data types collection, hashtable, date, etc. are as follows:

insert ClassStructure values("com.bedouin.Professor.bdPersistExample",22769601, "collection", "object", 'Jan. 01, 1970 12:00:00:004 AM','Dec. 31, 9999 11:59:59:994 PM')
insert ClassStructure values("com.bedouin.Professor.bdPersistExample", 22769601, "hashtable", "object", 'Jan. 01, 1970 12:00:00:004 AM','Dec. 31, 9999 11:59:59:994 PM')
insert ClassStructure values("com.bedouin.Professor.bdPersistExample", 22769601, "date", "date", 'Jan. 01, 1970 12:00:00:004 AM','Dec. 31, 9999 11:59:59:994 PM')
insert ClassStructure values("com.bedouin.Professor.bdPersistExample", 22769601, "money", "money", 'Jan. 01, 1970 12:00:00:004 AM','Dec. 31, 9999 11:59:59:994 PM')
insert ClassStructure values("com.bedouin.Professor.bdPersistExample", 22769601, "float", "float", 'Jan. 01, 1970 12:00:00:004 AM','Dec. 31, 9999 11:59:59:994 PM')
insert ClassStructure values("com.bedouin.Professor.bdPersistExample", 22769601, "text", "text", 'Jan. 01, 1970 12:00:00:004 AM','Dec. 31, 9999 11:59:59:994 PM')
insert ClassStructure values("com.bedouin.Professor.bdPersistExample", 22769601, "boolean", "boolean", 'Jan. 01, 1970 12:00:00:004 AM','Dec. 31, 9999 11:59:59:994 PM')
insert ClassStructure values("com.bedouin.Professor.bdPersistExample", 22769601, "int", "int", 'Jan. 01, 1970 12:00:00:004 AM','Dec. 31, 9999 11:59:59:994 PM')
insert ClassStructure values("com.bedouin.Professor.bdPersistExample", 22769601, "long", "long", 'Jan. 01, 1970 12:00:00:004 AM','Dec. 31, 9999 11:59:59:994 PM')
insert ClassStructure values("com.bedouin.Professor.bdPersistExample", 22769601, "string", "char",'Jan. 01, 1970 12:00:00:004 AM','Dec. 31, 9999 11:59:59:994 PM')

These entries specify the database values that will exist. There is no need to modify the database structure.

A class constructor for the bdPersistExample is set forth. The items listed are attributes and function settings for bdProfessor. These include the accessors, "set" and "get" which are functions that access the database. All temporally persistent classes require a context for their methods. In this case, the default context is used.
    public bdPersistExample( )
        throws bdX
    {
        initNewInstance(CLASSNAME, new bdContext( ));
    }/* */

"initNewInstance" will register this instance in the database. This class and its members must already be recorded in the ClassList and ClassStructure tables, respectively, before they are used.
    public bdPersistExample(bdContext arg0)
        throws bdX
    {
    initNewInstance(CLASSNAME, arg0);
    }/* */

The initNewInstance calls for the operator "new" which was discussed above, which is the setter for a new instance of this class.

Accessors for the variables in the object bdPersistExample are now set forth. These basically define for bdPersistExamples those methods of bdTemporalPersist that are used in running bdProfessor.java. These include both getters and setters, e.g., getNamedDate("date,arg0). The "arg0 is the context parameter of the method definition. The statement: throws bdX requires that an error be returned if it fails.

MEMBER ACCESSORS: date

```
//--=---- ----=---- ----=---- ----=---- ----=---- ----=---- ----=---- ----=---- public bdDate getDate( bdContext arg0 )

throws bdX

{ return getNamedDate("date", arg0 ) ;

}/* */
```

Here the accessor is "get." bdContext is the context object (which could be temporal or point of view). In this case it returns the temporal date.

```
//--=---- ----=---- ----=---- ----=---- ----=---- ----=---- ----=---- ----=---- public bdDate getDate()

throws bdX

{ return getNamedDate("date", new bdContext()) ;

}/* */

//--=---- ----=---- ----=---- ----=---- ----=---- ----=---- ----=---- ----=---- public void setDate( bdDate arg0, bdContext arg1 )

throws bdX

{ setNamedDate("date", arg0, arg1 ) ;

}/* */
```

Her the accessor is "set."

```
//--=---- ----=---- ----=---- ----=---- ----=---- ----=---- ----=---- ----=---- public void setDate( bdDate arg0 )

throws bdX

{ setNamedDate("date", arg0, new bdContext()) ;

}/* */
```

MEMBER ACCESSORS:  money

```
//--=---- ----=---- ----=---- ----=---- ----=---- ----=---- ----=---- ----=---- public bdMoney getMoney( bdContext arg0 )

throws bdX

{ return getNamedMoney("money", arg0 ) ;

}/* */
```

In this one the context is money.

```
//--=---- ----=---- ----=---- ----=---- ----=---- ----=---- ----=---- ----=---- public bdMoney getMoney()

throws bdX

{ return getNamedMoney("money", new bdContext()) ;

}/* */

//--=---- ----=---- ----=---- ----=---- ----=---- ----=---- ----=---- ----=---- public void setMoney( bdMoney arg0, bdContext arg1 )

throws bdX
```

```
{
    setNamedMoney("Money", arg0, arg1 );
}/* */
```

//--=---- ----=---- ----=---- ----=---- ----=---- ----=---- ----=---- ----=----

```
public void setMoney( bdMoney arg0 )
    throws bdX
{
    setNamedMoney("Money", arg0, new bdContext()) ;
}/* */
```

MEMBER ACCESSORS: float

//--=---- ----=---- ----=---- ----=---- ----=---- ----=---- ----=---- ----=----

```
public float getFloat( bdContext arg0 )
    throws bdX
{
    return getNamedFloat("float", arg0 ) ;
}/* */
```

These are floating point numbers.

//--=---- ----=---- ----=---- ----=---- ----=---- ----=---- ----=---- ----=----

```
public float getFloat()
    throws bdX
{
    return getNamedFloat("float", new bdContext()) ;
}/* */
```

```
//--=---- ----=---- ----=---- ----=---- ----=---- ----=---- ----=---- ----=---- public void setFloat( float arg0, bdContext arg1 )

throws bdX

{ setNamedFloat("float", arg0, arg1 ) ;

}/* */

//--=---- ----=---- ----=---- ----=---- ----=---- ----=---- ----=---- ----=---- public void setFloat( float arg0 )

throws bdX

{ setNamedFloat("float", arg0, new bdContext()) ;

}/* */
```

MEMBER ACCESSORS: text

```
//--=---- ----=---- ----=---- ----=---- ----=---- ----=---- ----=---- ----=---- public String getText( bdContext arg0 )

throws bdX

{ return getNamedText("text", arg0 ) ;

}/* */
```

This returns a text string.

```
//--=---- ----=---- ----=---- ----=---- ----=---- ----=---- ----=---- ----=---- public String getText()
``` throws bdX

{ return getNamedText("text", new bdContext());

}/* */

//--=---- ----=---- ----=---- ----=---- ----=---- ----=---- ----=---- ----=---- public void setText( String arg0, bdContext arg1 )

throws bdX

{ setNamedText("text", arg0, arg1 );

}/* */

//--=---- ----=---- ----=---- ----=---- ----=---- ----=---- ----=---- ----=---- public void setText( String arg0 )

throws bdX

{ setNamedText("text", arg0, new bdContext());

}/* */

MEMBER ACCESSORS: boolean

//--=---- ----=---- ----=---- ----=---- ----=---- ----=---- ----=---- ----=---- public boolean getBool( bdContext arg0 )

throws bdX

{ return getNamedBool("boolean", arg0 );

}/* */

This is a boolean function.

//--=---- ----=---- ----=---- ----=---- ----=---- ----=---- ----=---- ----=----

```
public boolean getBool()

throws bdX

{ return getNamedBool("boolean", new bdContext()) ;

}/* */
```

//--=---- ----=---- ----=---- ----=---- ----=---- ----=---- ----=---- ----=----

```
public void setBool( boolean arg0, bdContext arg1 )

throws bdX

{ setNamedBool("boolean", arg0, arg1 ) ;

}/* */
```

//--=---- ----=---- ----=---- ----=---- ----=---- ----=---- ----=---- ----=----

```
public void setBool( boolean arg0 )

throws bdX

{ setNamedBool("boolean", arg0, new bdContext()) ;

}/* */
```

MEMBER ACCESSORS: int (integer)

//--=---- ----=---- ----=---- ----=---- ----=---- ----=---- ----=---- ----=----

```
public int getInt( bdContext arg0 )

throws bdX
```

```
        return getNamedInt("int", arg0 ) ;

}/* */
```

This is an integer.

```
//--=---- ----=---- ----=---- ----=---- ----=---- ----=---- ----=---- ----=---- public int getInt()

throws bdX

{ return getNamedInt("int", new bdContext()) ;

}/* */

//--=---- ----=---- ----=---- ----=---- ----=---- ----=---- ----=---- ----=---- public void setInt( int arg0, bdContext arg1 )

throws bdX

{ setNamedInt("int", arg0, arg1 ) ;

}/* */

//--=---- ----=---- ----=---- ----=---- ----=---- ----=---- ----=---- ----=---- public void setInt( int arg0 )

throws bdX

{ setNamedInt("int", arg0, new bdContext()) ;

}/* */
```

MEMBER ACCESSORS: long

//--=---- ----=---- ----=---- ----=---- ----=---- ----=---- ----=---- ----=---- public long getLong( bdContext arg0 )

throws bdX

{ return getNamedLong("long", arg0 ) ;

}/* */

This is a longer version of int.

//--=---- ----=---- ----=---- ----=---- ----=---- ----=---- ----=---- ----=---- public long getLong()

throws bdX

{ return getNamedLong("long", new bdContext()) ;

}/* */

//--=---- ----=---- ----=---- ----=---- ----=---- ----=---- ----=---- ----=---- public void setLong( long arg0, bdContext arg1 )

throws bdX

{ setNamedLong("long", arg0, arg1 ) ;

}/* */

//--=---- ----=---- ----=---- ----=---- ----=---- ----=---- ----=---- ----=---- public void setLong( long arg0 )

throws bdX

{ setNamedLong("long", arg0, new bdContext()) ;

}/* */

MEMBER ACCESSORS: string

//--=---- ----=---- ----=---- ----=---- ----=---- ----=---- ----=---- ----=----

```
public String getString( bdContext arg0 )

throws bdX

{ return getNamedString("string", arg0 ) ;

}/* */
```

This is a string of characters.

//--=---- ----=---- ----=---- ----=---- ----=---- ----=---- ----=---- ----=----

```
public String getString()

throws bdX

{ return getNamedString("string", new bdContext()) ;

}/* */
```

//--=---- ----=---- ----=---- ----=---- ----=---- ----=---- ----=---- ----=----

```
public void setString( String arg0, bdContext arg1 )

throws bdX

{ setNamedString("string", arg0, arg1 ) ;

}/* */
```

//--=---- ----=---- ----=---- ----=---- ----=---- ----=---- ----=---- ----=----

```
public void setString( String arg0 )
``` throws bdX

{ setNamedString("string", arg0, new bdContext()) ;

}/* */

MEMBER ACCESSORS: collection

```
//--=---- ----=---- ----=---- ----=---- ----=---- ----=---- ----=---- ----=----
``` public bdTemporalCollection getCollection( bdContext arg0 )

throws bdX

{ return (bdTemporalCollection)

getNamedObject("collection", arg0 ) ;

}/* */

This is a collection.

```
//--=---- ----=---- ----=---- ----=---- ----=---- ----=---- ----=---- ----=----
``` public bdTemporalCollection getCollection()

throws bdX

{ return (bdTemporalCollection)

getNamedObject("collection", new bdContext()) ;

}/* */

```
//--=---- ----=---- ----=---- ----=---- ----=---- ----=---- ----=---- ----=----
``` public void setCollection( bdTemporalCollection arg0, bdContext arg1 )

throws bdX

```
{
    setNamedObject("collection", arg0, arg1 );
}/* */
```

//--=---- ----=---- ----=---- ----=---- ----=---- ----=---- ----=---- ----=----

```
public void setCollection( bdTemporalCollection arg0 )
    throws bdX
{
    setNamedObject("collection", arg0, new bdContext()) ;
}/* */
```

MEMBER ACCESSORS: hashtable

//--=---- ----=---- ----=---- ----=---- ----=---- ----=---- ----=---- ----=----

```
public bdTemporalHashtable getHashtable( bdContext arg0 )
    throws bdX
{
    return (bdTemporalHashtable)
        getNamedObject("hashtable", arg0 ) ;
}/* */
```

This is a hash table function.

//--=---- ----=---- ----=---- ----=---- ----=---- ----=---- ----=---- ----=----

```
public bdTemporalHashtable getHashtable()
    throws bdX
{
    return (bdTemporalHashtable)
```

```
        getNamedObject("hashtable", new bdContext()) ;

}/* */

//--=---- ----=---- ----=---- ----=---- ----=---- ----=---- ----=---- ----=---- public void setHashtable( bdTemporalHashtable arg0, bdContext arg1 )

throws bdX

{ setNamedObject("hashtable", arg0, arg1 ) ;

}/* */

//--=---- ----=---- ----=---- ----=---- ----=---- ----=---- ----=---- ----=---- public void setHashtable( bdTemporalHashtable arg0 )

throws bdX

{ setNamedObject("hashtable", arg0, new bdContext()) ;

}/* */

}
```

If it is necessary to edit historical data, commands are needed to make entries in the data tables, which can be problematic when they are inserted between or subsume existing temporal information. This is the case were old and new data overlap or leave gaps. This situation can handled by establishing commands, rules and specifications such as the following:

ADD_NEW_INSTANCE—This command creates a new entry in the instance table.

Figure 3:
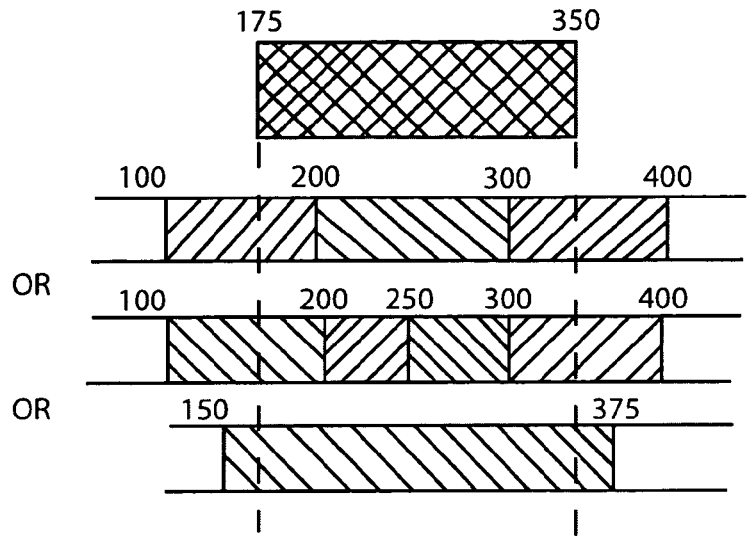
FIG. 3 is an illustration of the situation where the system of the present invention generates an error signal when additional temporal data is added to the database where it subsumes the values of the existing attribute values.

ADD_NEW_ATTRVAL_SHIFT—This command creates a new entry in the attribute value history of the specified attribute of the specified instance, shifting the existing attribute values according to the rules below. If the from-to range of this new attribute value lies within the from-to range of an existing attribute value (or coincides exactly), this flags an error. If the from-to range of this new attribute value subsumes one or more existing attribute values (or coincides exactly with BOTH of their endpoints—i.e. the earliest date-from and the latest date-to), this flags an error. The three illustrations of FIG. 3 show these error conditions, i.e., subsume 1 and 2, and subsumed-By.

Figure 4:
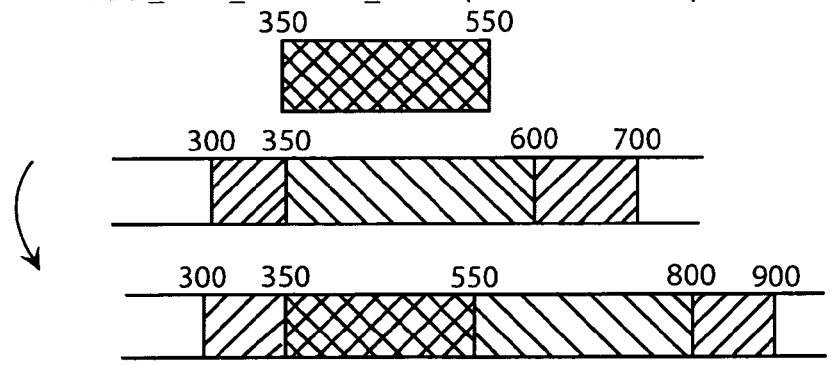
FIG. 4 is an illustration of how the system of the present invention handles the boundary conditions when additional temporal data is added to the data base where it is displaces the existing data in one direction.
Figure 5:
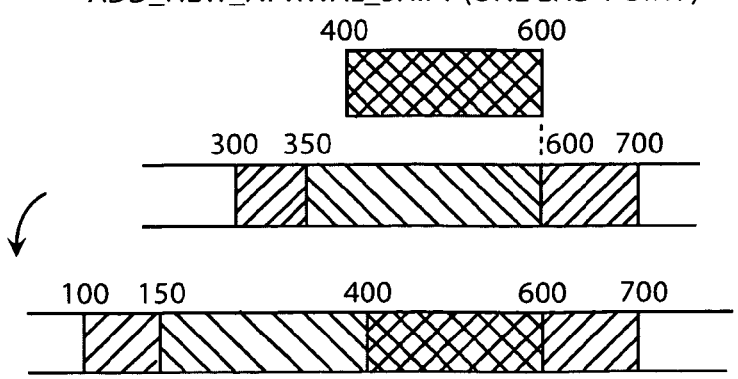
FIG. 5 is an illustration of how the system of the present invention handles the boundary conditions when additional temporal data is added to the data base where it is displaces the existing data in the opposite direction from that in FIG. 4.

If either (i.e. at most ONE) of the endpoints (date-from or date-to) coincide with an existing attribute value's endpoint, this inserts the new attribute value while shifting the coinciding attribute value to the opposite endpoint of the new attribute value and slides all other attribute values down in the same direction. FIGS. 4 and 5 illustrate the two possible end points.

Figure 6:
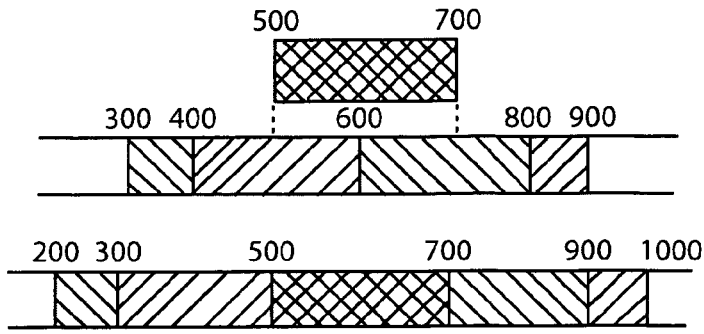
FIG. 6 is an illustration of how the system of the present invention handles the boundary conditions when additional temporal data is added to the data base where it is displaces the existing data in both directions.

If each endpoint of the new attribute value lies within the range of a different existing attribute value, both of which are (temporally) adjacent to each other, then as the new attribute value is inserted into the history, all attribute values on each side of the new attribute value are shifted in order for the endpoints of the two previously adjacent existing attribute values to match up with the endpoints of the new attribute value. This is shown in FIG. 6.

Figure 7:
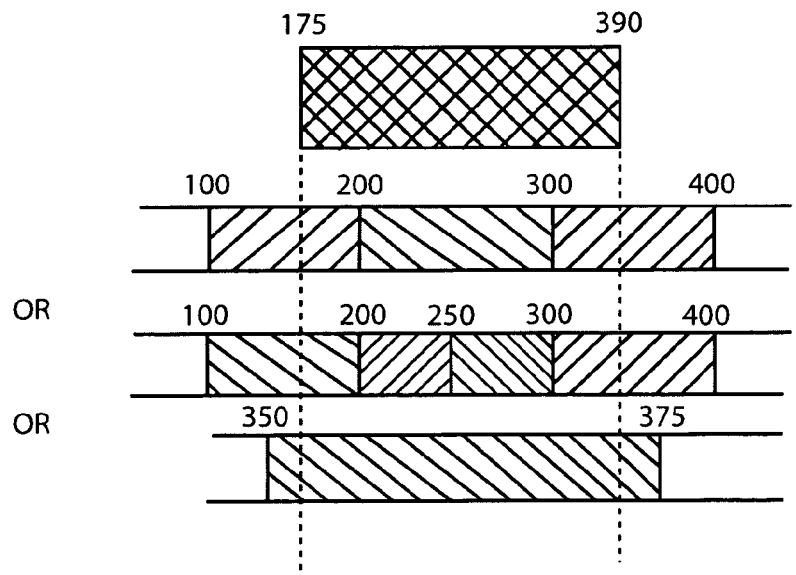
FIG. 7 is an illustration of the situation where the system of the present invention generates an error signal when additional temporal data is added to the database where it is within the range of existing data or subsumes existing values.

ADD_NEW_ATTRVAL_SQUEEZE—This creates a new entry in the attribute value history of the specified attribute of the specified instance, resizing at most two of the existing attribute values according to the rules below in order to fit the new attribute value. If the from-to range of this new attribute value lies within the from-to range of an existing attribute value (or coincides exactly), this flags an error. If the from-to range of this new attribute value subsumes one or more existing attribute values, this flags an error. The three error conditions, i.e., subsume 1 and 2, and subsumed-by, are shown in FIG. 7.

Figure 8:
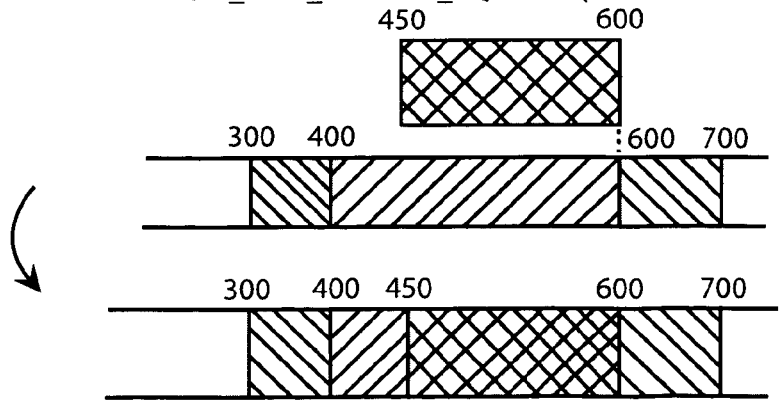
FIG. 8 is an illustration of how the system of the present invention handles the boundary conditions when additional temporal data is added to the data base which has an end point at one end of an attribute range that coincides with the endpoint of an existing attribute.
Figure 9:
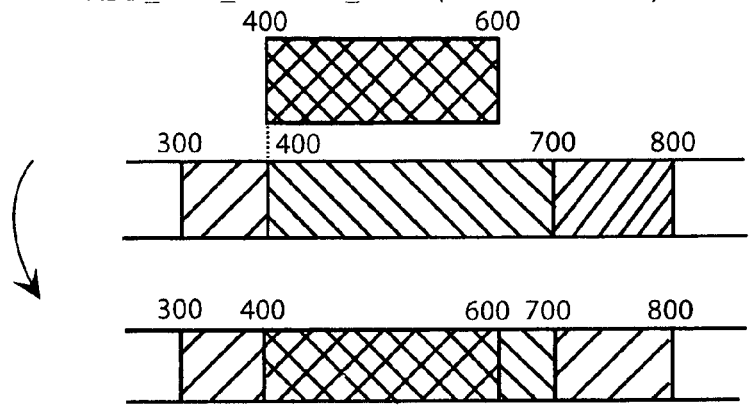
FIG. 9 is an illustration of how the system of the present invention handles the boundary conditions when additional temporal data is added to the data base which has an end point at the other end of an attribute range from that in FIG. 8 which coincides with the endpoint of an existing attribute.

If either (i.e. at most ONE) of the endpoints (date-from or date-to) coincide with an existing attribute value's endpoint, this inserts the new attribute value while shifting the existing attribute value's formerly coinciding endpoint to match the opposite endpoint of the new attribute value, leaving all other existing attribute values unchanged. The two possible end points are illustrated in FIGS. 8 and 9.

Figure 10:
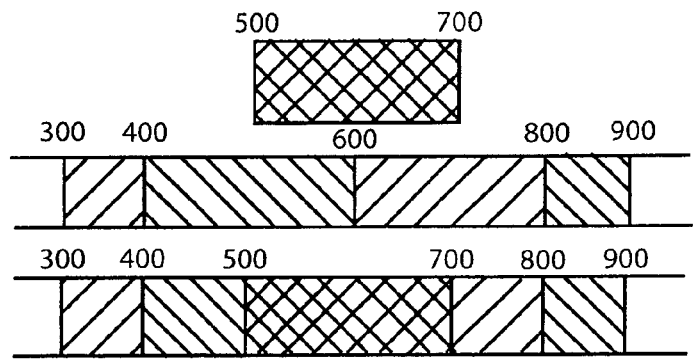
FIG. 10 is an illustration of how the system of the present invention handles the boundary conditions when additional temporal data is added to the data base which has end points that lie within the range of different existing adjacent attribute ranges.

If each endpoint of the new attribute value lies within the range of a different existing attribute value, both of which are (temporally) adjacent to each other, then as the new attribute value is inserted into the history, both "touching" endpoints of the attribute values on each side of the new attribute value are shifted in order for the endpoints of the two previously adjacent existing attribute values to match up with the endpoints of the new attribute value. This leaves all other attribute values unchanged. FIG. 10 illustrates this.

Figure 11:
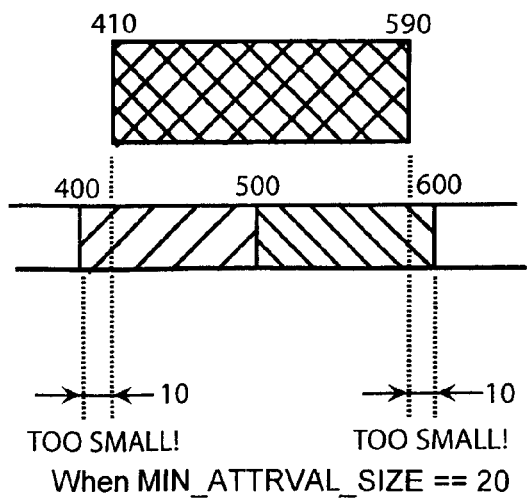
FIG. 11 is an illustration of the situation where the system of the present invention generates an error signal when additional temporal data is added to the database and it shifts the end points by less than the conventional grain size.

If any shifting of endpoints results in attribute values that are temporally smaller than the established conventional grain-size, this flags an error. FIG. 11 shows this condition.

FINAL_EDIT_ATTRVAL_VALUE_ONLY—This changes the specified attribute's value field. It flags an error if the existing attribute value (date-from, value, and date-to) does not match the one specified in the update message—in other words, if it is not found.

Figure 12:
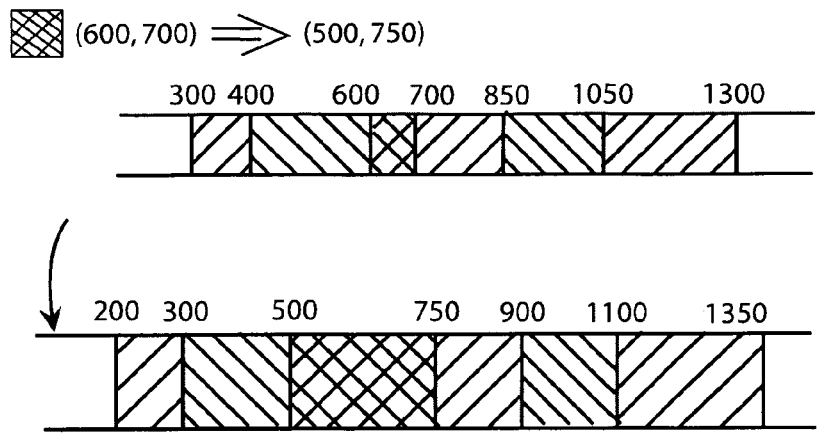
FIG. 12 is an illustration of how the system of the present invention handles the boundary conditions when additional temporal data is added to the data base which changes the end point of an existing attribute range and other ranges are shifted.

FINAL_EDIT_ATTRVAL_SHIFT—This changes the specified attribute value's date-from and/or date-to fields. It flags an error if the existing attribute value (date-from, value, and date-to) does not match the one specified in the update message—in other words, if it is not found. All surrounding attribute values in this attribute's value history are shifted over as needed to accommodate the new endpoints of this attribute value. FIG. 12 shows this.

This edit is logged or written to a wastebasket, but is otherwise "final" in that no other record is kept and an undo operation is relatively difficult to accomplish.

FINAL_EDIT_ATTRVAL_DATETO_SHIFT—This entry is exactly the same as the FINAL_EDIT_ATTRVAL_SHIFT, except that only the DateTo field is changed.

FINAL_EDIT_ATTRVAL_DATEFROM_SHIFT—This entry is exactly the same as the FINAL_EDIT_ATTRVAL_SHIFT, except that only the DateFrom field is changed.

Figure 13:
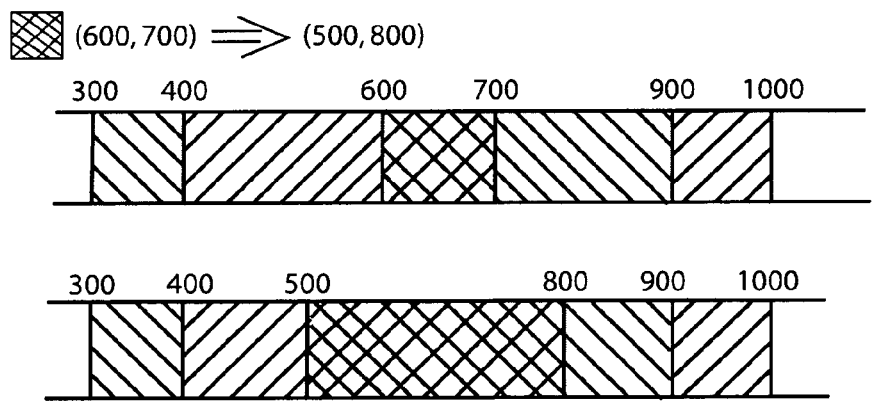
FIG. 13 is an illustration of how the system of the present invention handles the boundary conditions when additional temporal data is added to the data base which changes the end point of an existing attribute range, but the outermost ranges remain the same so the new data is squeezed into place.

FINAL_EDIT_ATTRVAL_SQUEEZE—This changes the specified attribute value's date-form and/or date-to fields. It flags an error if the existing attribute value (date-from, value, and date-to) does not match the one specified in the update message—in other words, if it is not found. Any (potentially two) attribute values adjacent to this attribute value are modified such that their endpoints match those of this attribute value. FIG. 13 illustrates this situation.

Figure 14:
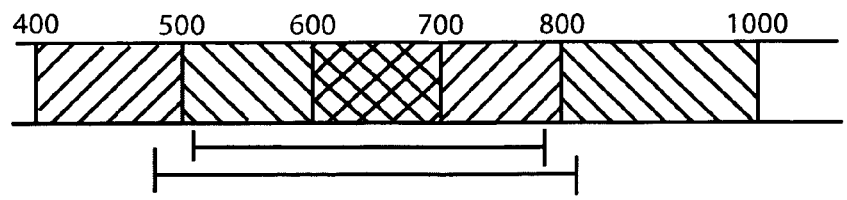
FIG. 14 is an illustration of the situation where the system of the present invention generates an error signal when additional temporal data is attempted to be added to existing range, which cannot be found.

If the new endpoints of this attribute value exceed the boundaries of its adjacent neighbors, an error is flagged. Similarly, if the modified adjacent attribute values are temporally smaller than the established conventional grain-size, an error is flagged. This is illustrated in FIG. 14. This edit is logged or written to a wastebasket, but is otherwise "final" in that no other record is kept and an undo operation is relatively expensive, i.e., difficult to achieve.

FINAL_EDIT_ATTRVAL_DATETO_SQUEEZE—This is exactly the same as the FINAL_EDIT_ATTRVAL_SQUEEZE, except that only the DateTo field is changed.

FINAL_EDIT_ATTRVAL_DATEFROM_SQUEEZE—This is exactly the same as the FINAL_EDIT_ATTRVAL_SQUEEZE, except that only the DateFrom field is changed.

Figure 15:
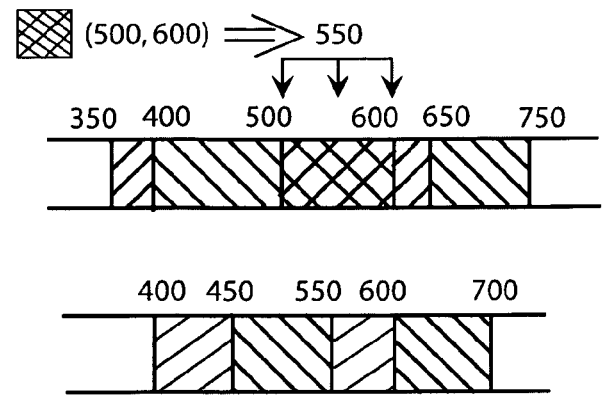
FIG. 15 is an illustration of how the system of the present invention generates an error signal, removes an existing attribute range and shifts the others to remove any gap, when an attribute range in an update message cannot be found.

FINAL_REMOVE_ATTRVAL_SHIFT—This removes the specified attribute value. It flags an error if the existing attribute value (date-from, value, and date-to) does not match the one specified in the update message—in other words, if it is not found. All surrounding attribute values in this attribute's value history are shifted over to close the temporal gap left by this removal. The point at which the shifted attribute values meet is specified in the update message, otherwise it follows the established convention for shifted-removal. This is illustrated in FIG. 15. This removal is logged or written to a wastebasket, but is otherwise "final" in that no other record is kept and an undo operation is relatively expensive.

Figure 16:
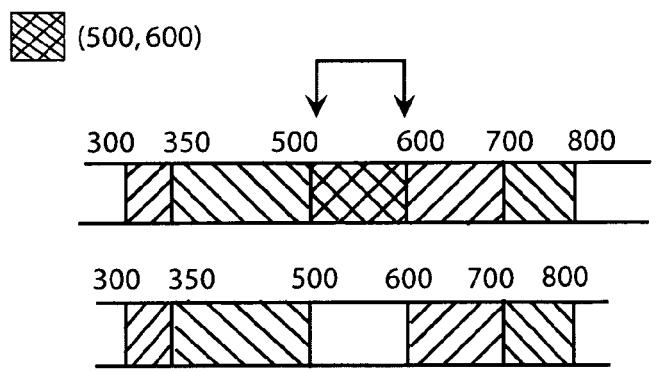
FIG. 16 is an illustration of how the system of the present invention generates an error signal, removes an existing attribute range and leaves the others unchanged so as to leave a gap, when an attribute range in an update message cannot be found.

FINAL_REMOVE_ATTRVAL_LEAVE_GAP—This removes the specified attribute value. It flags an error if the existing attribute value (date-from, value, and date-to) does not match the one specified in the update message—in other words, if it is not found. All surrounding attribute values in this attribute's value history are left unchanged. Effectively, a temporal gap is created in the space that this attribute value formerly occupied. FIG. 16 illustrates this condition. This removal is logged or written to a wastebasket, but is otherwise "final" in that no other record is kept and an undo operation is relatively expensive.

Figure 17:
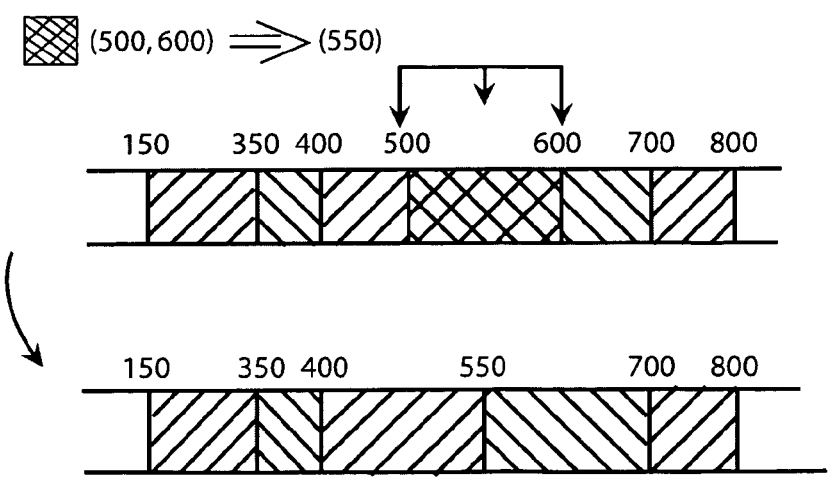
FIG. 17 is an illustration of how the system of the present invention generates an error signal, removes an existing attribute range and shifts the end points of the adjacent ranges to remove any gap, when an attribute range in an update message cannot be found.

FINAL_REMOVE_ATTRVAL_FILL—This removes the specified attribute value. It flags an error if the existing attribute value (date-from, value, and date-to) does not match the one specified in the update message—in other words, if it is not found. Any (potentially two) attribute values adjacent to this attribute value are modified such that their "inner" endpoints (those that used to be adjacent to the removed attribute value) close the gap left by the removal. The point at which the modified attribute values meet is specified in the update message, otherwise it follows the established convention for shifted-removal. This is shown in FIG. 17. This removal is logged or written to a wastebasket, but is otherwise "final" in that no other record is kept and an undo operation is relatively expensive.

FINAL_REMOVE_INSTANCE—This removes the specified instance. If the instance is not found, an error is flagged. This removal is logged or written to a wastebasket, but is otherwise "final" in that no other record is kept and an undo operation is relatively expensive.

Finally, the system needs overall boundary conditions for −INF and +INF. For example shifted and squeezed removals with adjacent attrval on one side only.

→MOVE-TO-INF?

Also, if there are "BLANKS" anywhere in the chain for a shift, then

à SHIFT ALL ANYWAY

The system can also be told that the time is in the future and it will create predictions. This can be done assuming various changes, e.g., in personnel, title, organization, etc. The current time is the generally accepted reality. Each prediction will have a different probability of occurring.

Further, the system allows the database information to be viewed from different vantage points at the same system time. If this is done, the system does not have a temporal context, but merely a context.

The full context concept (i.e., not limited to time) can be used in distributing a beta version of a program. Different customers would be given different vantage points on the same software. To accomplish this the attributes for the data objects would be different for each vantage point. Thus, the program would act differently for each customer. A customer could be directed to a particular vantage point by means of a customer ID distributed with the beta version. Each customer would then test the software from their vantage point and report to the developer so she could determine the best solution. Upon completion of the beta testing the vantage point of all of the beta test customers could be changed to the same preferred vantage point.

In another temporal situation, you could implement new tax rules, but make the data temporal. Thus, they would not take effect until the current time is the time when the rules should take effect. Further, software fixes can be implemented without overwriting old code. In the temporal context of after the fix, the system works. However, you can roll back time to the past and see how it behaved before the fix.

If the system has a data error in the past, you can establish a new vantage point in the past at which the error is corrected. Thus, you could see how the system actually behaved, as well as how it would have behaved if the error had not been made. Further, you can use past data and make assumptions, e.g., what if the stock had not split. This creates an alternate vantage point which allows you to compare what might have happened under certain circumstances with what actually happened.

Thus, you can have different vantage points in the past (error correction or past assumptions), present (beta testing various versions) and the future (various predictions).

In general an application according to the present invention can support temporal context, staging for "point of view," staging for dynamic namespace (contextual namespace), automatic object persistence and retrieval (object virtual memory) using a flat transaction model SQL and class migration. It can also work with various data structures including built-in" Java/SQL types, Collections, and Hash tables. There is no need to create a particular data structure.

In Java and C++ programming languages, the applications which are created used objects which are a subclass of a context base class, so they inherit contextual properties and there is a significant savings in programming effort.

It also provides an automatic Memory Manager for objects tuned by class at load time, tuned dynamically with optional "pre-fetch" hints in code. Objects can be loaded into active memory in anticipation of need based on the code and the pointers from one object to another. If the objects are time-stamped, they can be flushed from memory if they have not been used for a long time.

The code XML is a standard way to represent structured data in electronic format. It is similar to objects stored in memory. Using the invention it is possible to implement generic XML storage and retrieval. Further, it leads to smarter XML versioning. The same can be said of metadata, with which the present invention can be used.

While the invention has been particularly shown and described with reference to preferred embodiments thereof, it will be understood by those skilled in the art that various changes in form and details may be made therein without departing from the spirit and scope of the invention.

We claim:

1. An object-oriented temporal context programming system comprising:
    a database;
    data objects, each data object being defined by a class of object and having at least one attribute, said attribute being at least relatively persistently stored in the database so that past and present values of the attribute are stored in the database with an indication of the effective time of each value of the attribute; and
    methods which the class can carry out, said methods having an argument with an effective time, said method being at least relatively persistently stored in the database so that past and present versions of the method are stored in the database with an indication of the effective time of each version of the method, execution of said method with a particular time argument utilizing the particular values of attributes of the effected data objects and the particular version of the method in effect for the particular time specified.

2. An object-oriented temporal context programming system comprising:
    a database;
    data objects, each data object being defined by a class of object and having at least one attribute, said attribute being at least relatively persistently stored in the database, so that past and present values of the attribute are stored in the database with an indication of the effective time of each value of the attribute; and
    methods which the class can carry out, said methods having an argument which is effective time, execution of said method with a particular time argument utilizing the values of the attributes of the effected data objects in effect for the particular time specified.

3. An object-oriented temporal context programming system comprising:
- a database;
- data objects, each data object being defined by a class of object and having at least one attribute, said attribute being at least relatively persistently stored in the database, so that past and present values of the attribute are stored in the database; and
- methods which the class can carry out, said methods having an argument which is effective time, said method being at least relatively persistently stored in the database, so that past and present versions of the method are stored in the database with an indication of the effective time of each version of the method, execution of said method with a particular time argument utilizing the particular version of the method in effect for the particular time specified.

4. An object-oriented context programming system comprising:
- a database;
- data objects, each data object being defined by a class of object and having attributes, at least one attribute of one data object being at least relatively persistently stored in the database, so that at least two values of the attribute are stored in the database, each value being associated with an indication of the context thereof; and
- methods which the class can carry out, at least one of said methods having an argument which is an indication of context, said method being at least relatively persistently stored in the database, so that at least two versions of the method are stored in the database, each version being associated with an indication of the context thereof, a method executed with a particular context argument utilizing the values of the attributes of the effected data objects and the version of the method in effect for the particular context.

5. An object-oriented context programming system as claimed in claim 4 wherein the context is a version of an application program, so that by identifying a particular context a different version of the application program runs and gives the user a different vantage point from which to experience the program.

6. An object-oriented context programming system comprising:
- a database;
- data objects, each data object being defined by a class of object and having attributes, at least one attribute of one data object being at least relatively persistently stored in the database, so that at least two values for the attribute are stored in the database, each value being associated with an indication of the context of the value; and
- methods which the class can carry out, at least one of said methods having an argument which an indication of context, a method executed with a particular context argument utilizing the values of the attributes of the effected data objects in effect for the particular context.

7. An object-oriented context programming system comprising:
- data objects each being defined by a class of object and having attributes; and
- methods which the class can carry out, at least one of said methods having an argument which is an indication of context, said method being at least relatively persistently stored in the database, so that at least two versions of the method are stored in the database each version being associated with an indication of the context of the method, a method executed with a particular context argument utilizing the version of the method in effect for the particular context.

8. An object-oriented temporal context programming system as claimed in any one of claims 1–3, further including a new attribute added to said data object and being stored in the database with an indication of the effective time of the new attribute, which effective time is subsequent to the time of creation of the object.

9. An object-oriented context programming system as claimed in any one of claims 4–7, further including a new attribute added to said data object and being stored in the database with an indication of the context of the new attribute.

10. An object-oriented temporal context programming system as claimed in any one of claims 1–3, wherein the execution of said method is with respect to a time in the past.

11. An object-oriented temporal context programming system as claimed in claim 10 wherein one attribute has an additional context of an error and an equivalent attribute has an additional context of the error corrected, and wherein the methods can be run to show the effect in the past both with and without the error.

12. An object-oriented temporal context programming system as claimed in any one of claims 1–3, wherein the execution of said method is with respect to a time in the future, and the execution of the methods predicts events in the future based on probabilities.

13. An object-oriented temporal context programming system as claimed in any one of claims 1–3, wherein said class of object is formed from a temporal base class as a subclass of the temporal base object class and inherits its temporal context capabilities of reading (getting) or storing (setting) from the temporal base object class.

14. An object-oriented context programming system as claimed in any one of claims 4–7, wherein said class of object is formed from a base object class as a subclass of the base object class which inherits its context capabilities of reading (getting) or storing (setting) from the base object class.

* * * * *